May 23, 1933.     G. H. SCHATZ     1,910,061
ANTIFRICTION BEARING
Filed Dec. 27, 1930
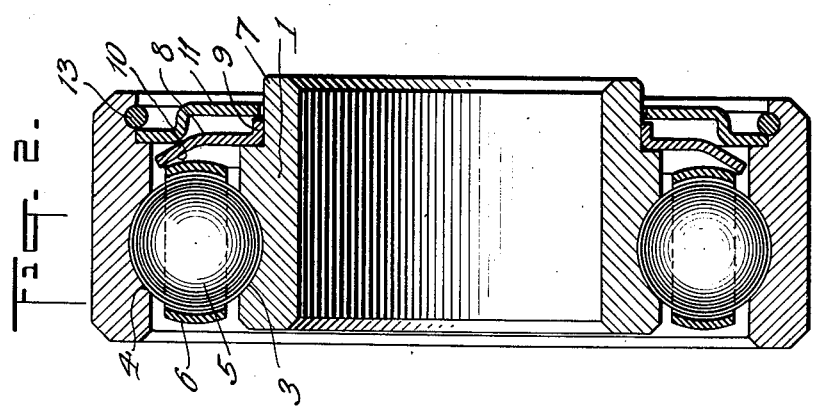
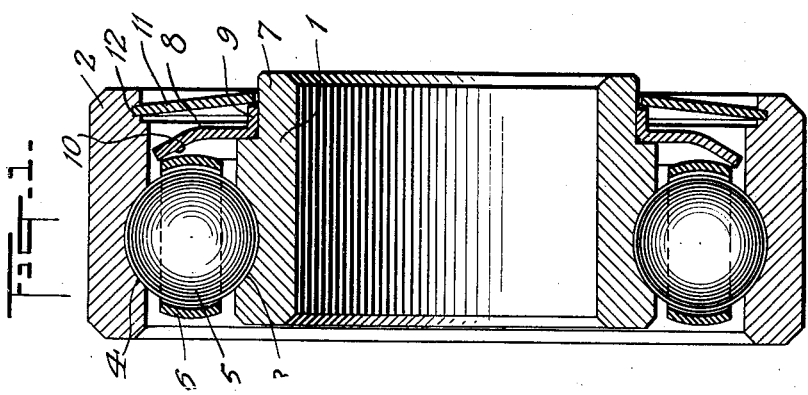
GROVER H. SCHATZ
Inventor
By his Attorney Patented May 23, 1933 1,910,061

UNITED STATES PATENT OFFICE

GROVER H. SCHATZ, OF POUGHKEEPSIE, NEW YORK, ASSIGNOR TO THE FEDERAL BEARINGS COMPANY, INC., OF POUGHKEEPSIE, NEW YORK, A CORPORATION OF NEW YORK

ANTIFRICTION BEARING

Application filed December 27, 1930. Serial No. 505,018.

This invention relates to anti-friction bearings having grease retaining seals.

In the past difficulty has been experienced in preventing the grease used in lubricating ball or roller bearings from escaping from its proper position adjacent the rolling surface. Various devices have been suggested for confining the grease between the relatively rotating inner and outer races, such as a felt washer fixed to one of the races and arranged to contact with the other of them. These felt washers are open to the objection that if made soft so as not to create excessive friction with the moving race the oil or grease is permitted to escape from its proper location by the capillary action of the felt, which acts like a wick. On the other hand if the felt is compressed to prevent this wick action it becomes so hard that it is liable to abrade the shaft, and in any event creates excessive friction in the bearing and heat, especially at high speeds. This heating effect is highly objectionable and should be avoided where the rotating shaft carries also some part, such as the commutator of an electric motor or generator, which is subject to deterioration at high temperatures. Other forms of grease retainers or seals have been suggested wherein felt or the equivalent is not used, the grease retaining action being secured through a plurality of closely spaced rings, some of which are affixed to the rotating member and others of which are held by the stationary member. The present invention relates to and covers an improvement on this latter class of grease retaining seals.

It is an object of my invention to provide an improved form of grease retainer or seal for anti-friction bearings, particularly for the ball type, which is not only cheap in construction and easy to assemble but also effective for all types of lubricants, whether oil or grease.

In accordance with my invention I secure to the inner race of the bearing a ring or annular shaped member which extends almost into contact with the outer race, the exact spacing being determined by the operating conditions and the type of grease being used. This ring is preferably dished in such manner that its periphery is nearer to the anti-friction elements than its hub. Where the anti-friction element is of the ball type the curvature of the dished ring and its location is preferably such that the curve of the ring forms roughly a continuation of the curvature of the ball track in the outer raceway. This construction insures that when the grease is forced away from the inner raceway by centrifugal force resulting from rotation of that raceway it will be directed inwardly by the dished rim of the retaining ring and thrown substantially under the rolling balls.

For preventing dust and dirt from entering the bearing an additional ring is secured to the outer raceway and extended inwardly nearly into contact with the inner raceway. This ring is placed outside of the inner grease retaining ring. The inner ring is preferably formed with a collar or shoulder thereon which has a hole slightly smaller than that of the raceway and so is adapted to form a pressed fit therewith. It is also desirable that the inner raceway should have a groove cut in the edge thereof to form a shoulder for the reception of this ring. The outer ring may either be snapped into a groove in the outer raceway or held in a groove by a spring wire retainer.

The above mentioned and further objects and advantages and the manner of attaining them will be made clear in the following description and accompanying drawing.

In the drawing, Fig. 1 illustrates one embodiment of my invention and Fig. 2, a modification of the device shown in Fig. 1.

Referring more particularly to the drawing, reference numeral 1 indicates an inner raceway and 2 an outer raceway. These raceways are grooved at 3 and 4 respectively for the reception of bearing balls 5 which are held in proper spaced relationship by the usual retainer 6. The inner raceway 1 is reduced in diameter at one end to form a shoulder 7 upon which is forced, at a pressed fit, a grease retaining ring or washer 8. This ring has formed thereon a collar or hub 9 for giving it additonal support on the shoulder 7, and is preferably dished as shown at 10 so that its periphery is closer than its hub to the balls 5. As shown in the drawing, the curvature of the dished portion 10 of the ring 8 is preferably such that it forms roughly a continuation of the curved groove in the outer raceway 2 whereby when grease is thrown off from the retaining ring 8 it is forced substantially under the balls 5. The ring may, however, have other curvatures than the preferred form just mentioned. Any dished effect given to the ring will tend to throw the grease or oil towards the balls and away from the opening between the periphery of the ring and the outer raceway 2, whereby the chances of the lubricant escaping are lessened. The outside diameter of the ring 8 should be made but slightly smaller than the inner diameter of the raceway 2 and the clearance between these two members should be selected with respect to the type of lubricant and the speed conditions under which the bearing is designed to operate. Where a lubricant of high viscosity is used the space may be greater than where light oil is applied.

The outer ring 11 which is snapped into groove 12 in the outer raceway 2 and extends almost into contact with inner raceway 1, serves to prevent grit, dust and other foreign substances from entering the bearing. This ring instead of being pressed into the groove as at 12 may be held in position by means of a spring wire retainer 13 in the manner shown in Fig. 2.

What I claim is:

An anti-friction bearing comprising an inner raceway, an outer raceway, bearing members between said raceways, a grease retaining ring secured to said inner raceway and dished toward said bearing members, and a second ring secured to said outer raceway in close proximity to said retaining ring but axially displaced therefrom on the side away from said members.

In testimony whereof: I have signed my name to this specification this 24th day of December, 1930.

GROVER H. SCHATZ.